(12) United States Patent
Taruishi

(10) Patent No.: US 6,649,271 B2
(45) Date of Patent: Nov. 18, 2003

(54) ANTI-STATIC ANTI-REFLECTIVE FILM

(75) Inventor: Tomohiro Taruishi, Shizuoka (JP)

(73) Assignee: Tomoegawa Paper Co., Ltd., Tokyo (JP)

(*) Notice: Subject to any disclaimer, the term of this patent is extended or adjusted under 35 U.S.C. 154(b) by 0 days.

(21) Appl. No.: 09/912,424

(22) Filed: Jul. 26, 2001

(65) Prior Publication Data

US 2002/0058147 A1 May 16, 2002

(30) Foreign Application Priority Data

Jul. 31, 2000 (JP) ........................................ 2000-230493

(51) Int. Cl.⁷ .................................................. B32B 9/04
(52) U.S. Cl. ........................ 428/447; 428/421; 428/448; 428/451
(58) Field of Search ................................. 428/447, 327, 428/421, 448, 451; 525/100, 105

(56) References Cited

U.S. PATENT DOCUMENTS

| | | | | |
|---|---|---|---|---|
| 4,614,675 A | * | 9/1986 | Ona et al. ................... | 427/387 |
| 5,688,561 A | * | 11/1997 | Ichikawa et al. ......... | 427/376.2 |
| 5,744,243 A | * | 4/1998 | Li et al. ..................... | 428/447 |
| 6,040,053 A | * | 3/2000 | Scholz et al. ............... | 428/412 |
| 6,129,980 A | * | 10/2000 | Tsukada et al. ............. | 428/327 |
| 6,291,535 B1 | * | 9/2001 | Watanabe et al. ............. | 516/34 |

\* cited by examiner

*Primary Examiner*—Robert Dawson
*Assistant Examiner*—Christopher M. Keehan
(74) *Attorney, Agent, or Firm*—Arent Fox Kintner Plotkin & Kahn

(57) ABSTRACT

The present invention provides an anti-static anti-reflective film which exhibits not only superior optical properties and physical properties, but also superior anti-static properties, and which is suitable for use in displays. A low reflective layer is provided by coating a silicon compound containing at least a cation-modified silicon compound on the surface of a transparent substrate directly or via another layer and by curing, and therefore an anti-static anti-reflective film is produced.

4 Claims, 1 Drawing Sheet

ANTI-STATIC ANTI-REFLECTIVE FILM

BACKGROUND OF THE INVENTION

The present invention relates to an anti-static anti-reflective film which is suitable for use in displays such as liquid crystal displays (LCDs), plasma displays (PDPs), CRTs, ELs, etc., and in particular, relates to an anti-static anti-reflective film exhibiting superior anti-reflective property, abrasion resistance, and anti-static properties.

Displays typified by LCDs, PDPs, CRTs, and ELs are widely used in various fields such as television and computer technologies, and have been developed rapidly. In particular, LCDs are in remarkably common use in notebook-type personal computers and word processors, portable telephones, PHSs, various portable terminals, etc., as displays which are thin, light, and extremely versatile.

In the past, in such displays, although an anti-reflective layer having a low refractive index had been formed to prevent reflection on the surface, there was a problem in that contamination such as dust, etc., adhered by static electricity occurring on the surface, since an insulating resin is generally used in the anti-reflective layer or other members constituting the display. As methods for preventing static electricity on the surface of the display, specifically, a method in which an anti-static layer is formed by depositing or sputtering an extremely thin layer of a metal oxide such as ITO or a metal such as aluminum or tin; by dispersing whiskers and metal microparticles such as those of aluminum or tin, whiskers and microparticles such as those of antimony-doped metal oxide such as tin oxide, fillerized charge-transfer complexes produced between 7,7,8,8-tetracyanoxydimethane and an electron donor such as an organic cation or a metal ion in a polyester resin, an acrylic resin, an epoxy resin, or the like, and subsequently solvent-coating; by solvent-coating a camphor-sulfonic-acid-doped polypyrrol, polyaniline, etc.; or a method in which an anti-reflective layer or another layer having an anti-static property is formed by containing the above anti-static materials therein, were typically used.

However, since the above anti-static fine particles and anti-static agents are materials having a very high refractive index, the refractive index of an anti-static layer or a layer containing the anti-static agent is increased, and therefore there was a problem in that the anti-reflective property thereof was deteriorated. Additionally, there was also a problem in that deterioration of abrasion resistance on the layer occurs due to the containing of such anti-static fine particles or anti-static agents.

SUMMARY OF INVENTION

The present invention has been made in view of the above circumstances, and it is an object thereof to provide an anti-static anti-reflective film which exhibits not only superior optical properties and physical properties but also superior anti-static properties.

The inventor has conducted various research with respect to anti-static properties on the mostsurface of an anti-reflective film in order to prevent static electricity occurring on the surface of displays, etc., and consequently, he has found that a superior anti-static property of the film can be exhibited by containing cation-modified silicon compounds in a low refractive layer while conventional superior optical properties and physical properties are maintained.

Therefore, an anti-static anti-reflective film according to the present invention is characterized in that a low reflective layer is provided on the surface of a transparent substrate directly or via another layer, the low reflective layer is formed by curing at least a silicon compound, and the silicon compound includes cation-modified silicon compounds.

In the following, preferable embodiments of an anti-static anti-reflective film of the present invention will be explained in detail.

A. Transparent Substrate

As a transparent substrate employed in an anti-static anti-reflective film according to the present invention, a conventional transparent film, glass, etc., can be employed. Specifically, various resin films such as polyethylene terephthalate (PET), triacetyl cellulose (TAC), polyacrylate, polyimide, polyether, polycarbonate, polysulfone, polyether sulfone, cellophane, aromatic polyamide, polyethylene, polypropylene, polyvinyl alcohol, and the like, and glass based materials such as fused glass, soda glass, and the like can be preferably employed. For PDPs and LCDs, PET and TAC are preferred.

The higher the transparency of the transparent substrate, the better the transparent substrate. The light transmittance (Japanese Industrial Standard C-6714) is preferably 80% or more, and is more preferably 90% or more. In the case in which the transparent substrate is employed in a compact and light-weight liquid-crystal display, the transparent substrate is preferably in the form of a film. It is desirable that the transparent substrate be thin from the standpoint of being light-weight, and it is preferred that the thickness of the transparent substrate be preferably 10 to 500 $\mu$m in consideration of the productivity thereof.

In addition, the adhesion between the low reflective layer or another layer provided thereunder and the transparent substrate can be improved by surface-treatment of the transparent substrate such as an alkaline treatment, corona treatment, plasma treatment, fluorine treatment, sputtering treatment, or the like, a coating, on the transparent substrate, of a surface active agent, a silane coupling agent, or the like, or a surface-modification-treatment such as a Si deposition or the like.

B. Low Reflective Layer

A low reflective layer of the present invention is formed by curing at least a silicon compound, and preferably by curing a silica sol. The silica sol is a sol in which silica microparticles are dispersed in water or an organic solvent, and is produced by a method for condensation of an activated silicic acid which de-alkalizes an alkali metal ion in an alkaline salt of silicic acid by ion exchange, etc., or which neutralizes an alkaline salt of silicic acid with a mineral acid, or by a method for hydrolysis and condensation of an alkoxysilane in an organic solvent in the presence of a basic catalyst. Alternatively, an organic-solvent type silica sol (organosilica sol) obtained by replacing the water in an aqueous silica sol described above with an organic solvent by a distillation method may be employed. These silica sols can be employed in either an aqueous or organic-solvent condition. It is not necessary to completely replace the water with the organic solvent in the case of production of the organic-solvent type silica sol. The silica sol contains a solid component as $SiO_2$ in a concentration of 0.5 to 50% by weight. Various types of silica ultra-microparticles in the silica sol, such as in a spheroidal form, a needle form, a plate form, or the like can be employed.

In addition, it is desirable that the pH be nearly neutral in consideration of dispersiveness to solvent, etc., since the silica sol is generally used by dispersing in organic solvent. The particle size of the silica sol is preferably 5 to 500 nm, and is more preferably 5 to 300 nm. When the particle size of the silica sol is below 5 nm, a reduction of the reflective characteristics can be insufficiently obtained. In contrast, when the particle size of the silica sol exceeds 500 nm, the haze value is increased and the surface of the film is hazy white, and in addition, the anti-static property is undesirable.

In addition, in the silicon compound in the present invention, a cation-modified silicon compound which works as a film forming agent and an anti-static agent must be contained. Furthermore, it is preferable that this cation-modified silicon compound contain nitrogen, and in particular, that nitrogen be contained as a quaternary ammonium salt. Specifically, as a cation-modified silicon compound, octadecyl dimethyl [3-(trimethoxysilyl) propyl] ammonium chloride, N-(3-trimethoxysilylpropyl)-N-methyl-N,N-diallyl ammonium chloride, N,N-didecyl-N-methyl-N-(3-trimethoxysilylpropyl) ammonium chloride, octadecyl dimethyl (3-trimethoxysilylpropyl) ammonium chloride, tetradecyl dimethyl (3-trimethoxysilylpropyl) ammonium chloride, N-trimethoxysilylpropyl-N,N,N-tri-n-butyl ammonium chloride, N-trimethoxysilylpropyl-N,N,N-trimethyl ammonium chloride, trimethoxysilylpropyl (polyethyleneimine), dimethoxymethylsilylpropyl modified (polyethyleneimine), etc., can be mentioned.

It is preferable that the cation-modified silicon compound in the present invention be a compound containing a nitrogen atom as a quaternary ammonium salt, because it is stable and handling thereof is easy. In addition, it is preferable that the cation-modified silicon compound in the present invention be employed so that the nitrogen content in a low reflective layer is 0.5 to 2.0% by weight, and more preferably 0.8 to 1.8% by weight, since there is a problem in which the containing of the nitrogen atom increases the refractive index, and therefore, the anti-reflection property is deteriorated. When the nitrogen content is below 0.5% by weight, the content of the quarternary ammonium salt is low, and the anti-static property is not sufficiently exhibited. In contrast, when the nitrogen content exceeds 2.0% by weight, there is a problem in that the anti-reflective property is deteriorated, and the abrasion resistance and water resistance are decreased.

Furthermore, it is preferable that the silicon compound in the present invention contain a fluorine-modified silicon compound as a film forming agent, because the anti-reflective property and abrasion resistance are improved. As a fluorine-modified silicon compound, trifluoropropyl trimethoxysilane, trifluoropropyl triethoxysilane, tridecafluorooctyl trimethoxysilane, tridecafluorooctyl triethoxysilane, heptadecafluorodecyl trimethoxysilane, heptadecafluorodecyl triethoxysilane, etc., can be mentioned. These can be employed alone or in combination. In addition, it is preferable that the content of fluorine-modified silicon compound be employed so that the ratio of fluorine atoms to silicon atoms (F/Si) in the silicon compound for forming a low reflective layer is 1.0 to 7.5, and more preferably 2.5 to 6.5.

The low reflective layer according to the present invention can be obtained, for example, by diluting the silicon compounds described above with a solvent, applying the silicon compounds directly on the substrate or via another layer by means of a spin coater, a roll coater, a printer, or the like, drying them at 50 to 80° C., and curing them by heating at 100 to 500° C. In the case in which, in the transparent substrate, a plastic film such as one of PET, TAC, or the like, which is liable to be damaged by heat, is employed, it is preferable that the heat-curing temperature be set low within a range not having a deleterious influence on the plastic film.

The thickness of the low reflective layer for exhibiting superior anti-reflective properties can be calculated according to a well-known expression. According to a well-known document (Science Library, Physics 9 "Optics", pp. 70 to 72), when incident light is transmitted vertically to a low reflective layer, it is considered that the conditions for which the low reflective layer does not reflect the light and for which the light is transmitted at 100% will be satisfied in the following relational expression. In the expression, $N_0$ is the refractive index of the low reflective layer, $N_S$ is the refractive index of the substrate or an under layer on the substrate side, h is the thickness of the low reflective layer, and $\lambda_0$ is the wavelength of the light.

$$N_0 = N_S^{1/2} \qquad \text{Expression(1)}$$

$$N_0 h = \lambda_0/4 \qquad \text{Expression(2)}$$

According to Expression (1), it can be seen that in order to prevent the light reflection completely (100%), a material wherein the refractive index of the low reflective layer corresponds to the square root of the refractive index of the substrate or the lower layer may be selected. In practice, it is difficult to find a material that satisfies the expression exactly, and therefore, a material which has properties very similar to those of a material that satisfies the expression exactly is used. In expression (2), the optimum thickness as an anti-reflective film of the low reflective layer can be calculated from the refractive index of the low reflective layer selected according to expression (1) and the wavelength of the light. For example, in the case where the refractive index of the substrate or the under layer and that of the low reflective layer are 1.50 and 1.38, respectively, and the wavelength of the light is 550 nm, an optical film thickness of the low reflective layer is calculated as approximately 0.1 $\mu$m, and is preferably in a range of 0.1±0.01 $\mu$m, according to expression (2).

C. Other Layers

In the present invention, the above transparent substrate, and low reflective layer are the basic composition, and in addition, a hard coat layer, an anti-glare layer, etc., can be provided between the substrate and the low reflective layer by laminating as necessary. In the following, these are explained.

① Hard Coat Layer

As a resin for forming a hard coat layer, resins for a hard coating can be employed. In the present invention, a "hard coat" refers to one having a pencil hardness of H or more described in the following. As the resin, a resin cured by means of radiation or heat, or a combination thereof, can be employed. As a radiation curable resin, compounds appropriately mixed with monomers, oligomers, or prepolymers having polymeric unsaturated bonds such as for an acryloyl group, methacryloyl group, acryloyloxy group, methacryloyloxy group, or the like, can be employed. As a monomer, acrylic acid derivatives of monofunctional acrylates such as methyl acrylate, lauryl acrylate, ethoxy diethylene glycol acrylate, methoxy triethyleneglycol acrylate, phenoxy ethylacrylate, tetrahydrofurfuryl acrylate, isobornyl acrylate, 2-hydroxyethyl acrylate, 2-hydroxypropyl acrylate, 2-hydroxy-3-phenoxy acrylate, or the like; and of multifunctional acrylates such as neopentylglycol diacrylate, 1,6-hexanediol diacrylate, trimethylolpropane triacrylate, pentaerythritol triacrylate, pentaerythritol tetraacrylate, dipentaerythritol hexaacrylate, trimethylolpropane acrylic acid benzoate, trimethylolpropane benzoate, or the like; methacrylic acid derivatives of monofunctional methacrylate such as methyl methacrylate, 2-ethylhexyl methacrylate, n-stearyl methacrylate, cyclohexyl methacrylate, tetrahydrofurfuryl methacrylate, phenoxyethyl methacrylate, methoxy polyethylene methacrylate, 2-hydroxyethyl methacrylate, 2-hydroxybutyl methacrylate, etc.; and of multifunctional methacrylates such as 1,6-hexanediol dimethacrylate, trimethylolpropane trimethacrylate, glycerol dimethacrylate, ethylene glycol dimethacrylate, or the like; a urethane acrylate such as glycerin dimethacrylate hexamethylene diisocyanate, pentaerythritol triacrylate hexamethylene diisocyanate, or the like; can be mentioned. As an oligomer or prepolymer, an acrylate such as polyester acrylate, polyurethane acrylate, epoxy acrylate, polyether acrylate, alkyd acrylate, melamine acrylate, silicone acrylate, or the like, an unsaturated polyester, an epoxy-type compound, or the like, can be mentioned. These can be employed alone or in combination. In the case in which flexibility of the curing film is required, the amount of monomer employed is reduced. Furthermore, in order to reduce cross-linking density, it is preferable that an acrylic monomer having a mono-functional or bi-functional acrylate be employed. Whereas in the case in which superior durability such as thermal resistance, abrasion resistance, solvent resistance, or the like, is required in the curing film, it is preferable that the amount of the monomer be increased or that an acrylic monomer having a tri-functional or greater acrylate be employed.

In order to cure the radiation curable resin as described above, for example, it is necessary that radiation such as UV, electron beams, X-rays, or the like, be irradiated on the resin, and a polymerization initiator can be appropriately added to the resin, as necessary. In the case of curing by means of irradiating with UV, a photopolymerization initiator must be added. As a photopolymerization initiator, an acetophenone such as diethoxy acetophenone, 2-hydroxy-2-methyl-1-phenylpropan-1-one, benzyl dimethyl ketal, 1-hydroxycyclohexyl-phenylketone, 2-methyl-2-monophorino (4-thiomethylphenyl) propan-1-one, or the like; a benzoin ether such as benzoin methylether, benzoin ethylether, benzoin isopropylether, benzoin isobutylether, or the like; a benzophenone such as benzophenone, o-benzoyl methyl benzoate, 4-phenyl benzophenone, 4-benzoyl-4'-methyl-diphenyl sulfide, 4-benzoyl-N,N-dimethyl-N-[2-(1-oxo-2-propenyloxy) ethyl]benzene methanaminuim bromide, (4-benzoylbenzyl) trimethyl ammonium chloride, or the like; a thioxanthone such as 2,4-diethyl thioxanthone, 1-chloro-4-dichloro thioxanthone, or the like; 2,4,6-trimethylbenzoyl diphenylbenzoyl oxide, or the like; can be mentioned. These can be employed alone or in combination. In addition, as an accelerator (sensitizer), an amine-type compound such as N,N-dimethyl paratoluidine, 4,4'-diethylamino benzophenone, or the like, can be employed in combination. The content of the photopolymerization initiator is preferably in an amount of 0.1 to 10.0% by weight to the radiation curable resin. If the content is not in this range, UV-curing is insufficient.

The volumetric shrinkage ratio associated with the curing of the hard coat layer employing the above radiation curable resin (calculated by the following method) is preferably 20% or less. With a volumetric shrinkage ratio of 20% or more, in the case of a film-shaped transparent substrate, the film will curl severely, and in the case of a rigid substrate such as a glass or the like, the adhesion between the substrate and the hard coat layer will be reduced.

Volumetric shrinkage ratio: $D=(S-S')/S \times 100$ wherein
S: specific gravity before curing
S': specific gravity after curing (Specific gravity is measured by the B method picnometer method of Japanese Industrial Standard K-7112.)

In the hard coat layer according to the present invention, a stabilizer (a thermal polymerization inhibitor) for the radiation curable resin such as hydroquinone, p-benzoquinone, t-butylhydroquinone, etc., may be added. It is preferred that the stabilizer be employed in a range of 0.1 to 5.0% by weight to the radiation curable resin.

As a thermosetting resin which can be used in the hard coat layer, phenol resin, furan resin, xylene-formaldehyde resin, ketone-formaldehyde resin, urea resin, melamine resin, aniline resin, alkyd resin, unsaturated polyester resin, epoxy resin, etc., can be employed. These may be employed alone or in combination. In the case in which a transparent substrate consists of plastics, the heat curing temperature cannot be set at a high temperature. In particular, in the case in which PET or TAC is employed, a thermosetting resin which can be cured at 100° C. or less is desirably employed.

It is preferable that the curable resin employed in the hard coat layer have a higher transparency. The light permeability (Japanese Industrial Standard C-6714) is preferably 80% or more, and more preferably 90% or more, similarly in the case of the transparent substrate. In the anti-reflective property of the anti-static anti-reflective film according to the present invention, the refractive index of the hard coat layer is preferably in a range of 1.45 to 1.70, and more preferably in a range of 1.5 to 1.65. The refractive index of the hard coat layer can be adjusted by adding high refractive index materials.

As a high refractive index material, a resin including an aromatic ring or a halogen element such as Br, I, Cl, etc., such as a styrol plastic such polystyrene, etc., PET, polycarbonate of bisphenol A, polyvinyl chloride, polytetrabromobisphenol A glycidyl ether, etc., and a resin including S, N, P, etc., such as polyvinyl pyridine, polybisphenol S glycidyl ether, or the like can be recited. Additionally, as another high refractive index material, an inorganic compound fine particle of $TiO_2$ (refractive index: n=2.3 to 2.7), $CeO_2$ (n=1.95), ZnO (n=1.9), $Sb_2O_5$ (n=1.71), $SnO_2$ (n=1.95), ITO (n=1.95), $Y_2O_3$ (n=1.87), $La_2O_3$ (n=1.95), $ZrO_2$ (n=2.05), $Al_2O_3$ (n=1.63), $HfO_2$ (n=200), $Ta_2O_5$, or the like can be recited. These may be employed alone or in combination.

In the present invention, as a method for forming a hard coat layer, directly or via another layer, on one surface of the transparent substrate, there can be mentioned a method consisting of the steps of: mixing appropriately fillers such as crosslinked acryl beads, etc., and water or organic solvent in the resin for forming a hard coat layer described above as necessary; dispersing the mixture using a paint shaker, sand mill, pearl mill, ball mill, attritor, roll mill, high-speed impeller disperser, jet mill, high-speed impact mill, ultrasonic disperser, or the like, to form a coating material or an ink; providing one layer on one surface of the transparent substrate by means of a printing method such as a letterpress printing method such as a flexographic printing method or the like, an intaglio printing method such as a direct gravure printing method, offset gravure printing method, or the like, a planographic printing method such as an offset printing method or the like, a stencil printing method such as a screen process printing method or the like, or a coating method such as an air doctor coating method, blade coating method, knife coating method, reverse coating method, transfer roll coating method, gravure roll coating method, kiss coating method, cast coating method, spray coating method, slot orifice coating method, calender coating method, electrodeposition coating method, dip coating method, die coating method or the like; thermal-drying the coating or printing layers in the case where a solvent is included; and curing the coating or printing layers by means of radiation (in the case of UV radiation, a photo-polymerization initiator is necessary). In the case where the radiation is an electron beam, an electron beam having an energy of 50 KeV to 1000 KeV emitted from various electron beam accelerators such as a Cockroft-Walton apparatus, Van de Graff apparatus, resonance transformer apparatus, insulating core transformer apparatus, linear type apparatus, dynamitron type apparatus, high-frequency type apparatus, or the like may be employed. In the case where the radiation is UV radiation, the UV radiation emitted from the light of an extra-high pressure mercury vapor lamp, high pressure mercury vapor lamp, low pressure mercury vapor lamp, carbon arc lamp, xenon arc lamp, metal halide lamp, or the like can be employed.

In order to improve the coating aptitude or printing aptitude of a coating material or an ink, a levelling agent such as silicone oil or the like, fats and oils such as polyethylene wax, carnauba wax, higher alcohols, bisamide, higher fatty acids, or the like, a curing agent such as isocyanate or the like, an additive such as ultra-microparticles having a particle size of 0.1 $\mu$m or less, such as those of calcium carbonate, synthetic mica, or the like, can be employed, as necessary.

The thickness of the hard coat layer is preferably in a range of 0.5 to 10 $\mu$m, and more preferably in a range of 1 to 5 $\mu$m. In the case where the thickness of the hard coat layer is less than 0.5 $\mu$m, abrasion resistance of the hard coat layer is degraded, or in the case of a UV-curable resin being employed in the hard coat layer, the resin fails to cure due to oxidation inhibition. In contrast, in the case where the thickness of the hard coat layer is more than 10 $\mu$m, curling occurs due to curing-shrinkage of the resin, microcracking occurs in the hard coat layer, or the adhesion between the transparent substrate and the hard coat layer is decreased.

② Anti-glare Layer

As an aspect of the present invention, an anti-glare layer may be further provided between the substrate and the low reflective layer. The anti-glare layer is formed by containing a filler in a resin generally used as a binding agent, preferably the above resin for forming a hard coat layer (in this case, the layer is a hard coat anti-glare layer). The light is scattered or diffused by roughening the surface thereof, and thereby the anti-glare effects can be obtained. As the filler, there can be mentioned an inorganic white pigment such as silica, calcium carbonate, aluminum hydroxide, magnesium hydroxide, clay, talc, titanium dioxide, or the like, or an organic transparent or white pigment such as an acrylic resin, polystyrene resin, polyethylene resin, epoxy resin, silicone resin, or the like. In particular, an organic filler which is spheroidal and does not exhibit oil absorbing properties is preferable. By means of employing spheroidal fillers, the projecting parts projecting from the surface of the anti-glare layer are moderated, and contaminants such as oil do not adhere well, and in addition, it is easy to wipe off adhering contaminants.

The filler is preferably present in an amount of 0.5 to 30% in total solid ratio of the anti-glare layer. In particular, it is more preferably present in a range of 1 to 15%. With 0.5% or less of the filler, sufficient anti-reflection effects cannot be obtained. On the other hand, with 30% or more of the filler, not only are the transparency and the contrast of the image degraded, but also durability such as abrasion resistance, environmental resistance, and the like is impaired. In addition, the refractive index of the filler (B method according to Japanese Industrial Standard K-7142) is preferably equivalent to that of the curable resin. In the case where the refractive index of the filler is different from that of the curable resin, light is scattered at the interface of the resin and the filler, and therefore the transparency is impaired. As an example of fillers having a refractive index equivalent to that of the curable resin, there can be mentioned organic fillers, and in particular crosslinked acryl beads.

As the crosslinked acryl beads, those consisting of polymers and copolymers obtained by means of polymerization, such as suspension polymerization, using an acrylic monomer, such as acrylic acid and an ester thereof, methacrylic acid and an ester thereof, acrylic amide, acrylonitrile, or the like, a polymerization initiator such as persulfuric acid, or the like, and a crosslinking agent such as ethylene glycol dimethacrylate, or the like, is preferably employed. In particular, as an acrylic monomer, a monomer using methyl methacrylate is preferred. The crosslinked acrylic beads thus obtained are spheroidal and do not exhibit oil absorbing characteristics. For this reason, in the case where the beads are employed in the anti-glare layer, excellent stain resistance can be exhibited. In addition, the crosslinked acrylic beads may be surface-treated by fats and oils, a silane-coupling agent, an organic or inorganic material such as a metal oxide, or the like in order to improve dispensability of the coating material.

The anti-glare layer according to the present invention can be provided by the same manner as the above laminating method of the hard coat layer.

In the anti-static anti-reflective film according to the present invention produced by the above process, the HAZE value according to Japanese Industrial Standard K-7105 is preferably in a range of 3 to 30, and more preferably in a range of 5 to 15. With a HAZE value of less than 3, the light scattering effects are small, and therefore sufficient anti-reflection effects cannot be obtained. On the other hand, with a HAZE value of more than 30, the image contrast is degraded and visibility is degraded, and for these reasons, it is not preferred since an inferior display will result. The HAZE value is a clouding value, and it is calculated according to the following expression by measuring a luminous diffuse transmittance (Td %) and a total light transmittance (Tt %) using an integrating sphere type light transmittance measuring apparatus.

HAZE value=$Td/Tt \times 100$

DETAILED DESCRIPTION OF THE PREFERRED EMBODIMENTS

An anti-static anti-reflective film according to the present invention will be explained in detail with reference to the accompanying drawings.

Figure 1:
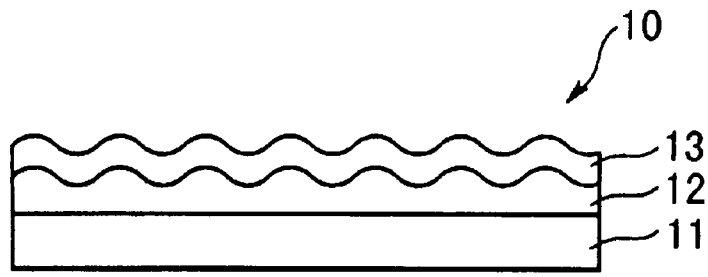
FIG. 1 is a schematic cross-sectional drawing showing a structure of an anti-static anti-reflective film according to the present invention.

FIG. 1 shows a schematic cross section of an anti-static anti-reflective film according to the present invention. The anti-static anti-reflective film 10 consists of a transparent substrate 11, a hard coat layer 12 formed on a surface thereof, and a low reflective layer 13 formed on the surface of the hard coat layer 12.

Figure 2:
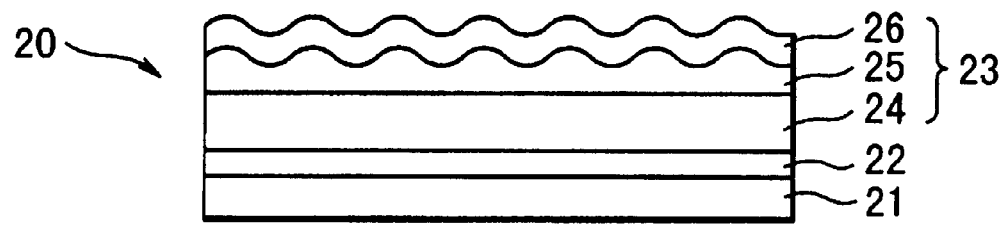
FIG. 2 is a schematic cross-sectional drawing showing a structure of a polarization film employing an anti-static anti-reflective film according to the present invention.

FIG. 2 shows a schematic cross section of a polarization film employing an anti-static anti-reflective film according to the present invention. In the polarization film 20, a first protective material 23, that is, an anti-static anti-reflective film consisting of an anti-glare layer 25 and a low reflective layer 26 laminated on a transparent substrate 24, is formed on one surface of a polarization substrate 22, and a second protective material 21 is formed on the other surface of the polarization substrate 22.

Figure 3:
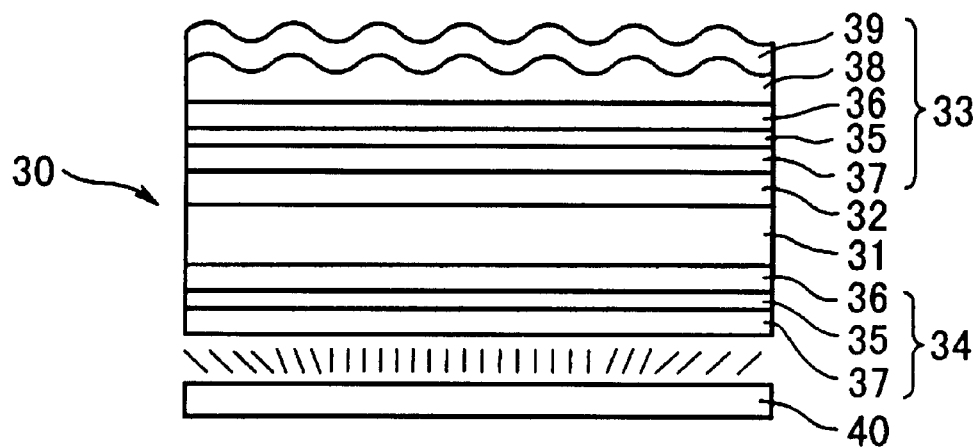
FIG. 3 is a schematic cross-sectional drawing showing a structure of a liquid crystal display equipped with a polarization film employing an anti-static anti-reflective film according to the present invention.

FIG. 3 shows a liquid crystal display 30 having improved anti-static properties due to an anti-static anti-reflective film according to the present invention. In the liquid crystal display 30, a back light 40 is disposed at the rear (the lower side in FIG. 3) thereof; a liquid crystal cell 32 and a polarization film 33 having a low reflective layer are laminated on the front (the upper side in FIG. 3) of a TFT glass substrate 31, in that order; and a polarization film 34 without a low reflective layer is laminated on the rear of the TFT glass substrate 31.

In the liquid crystal cell 32, for example, a twisted nematic (TN) liquid crystal cell can be used. In the TN liquid crystal cell, alignment layers are formed by coating a polyimide resin on transparent electrodes of a pair of glass substrates having a desired pattern. The alignment layers are aligned by a rubbing treatment. Then, a nematic liquid crystal is filled between the glass substrates and is sealed therein by adhering the periphery of the glass substrate with an epoxy resin. The nematic liquid crystal is aligned with a twist angle of 90 degrees by virtue of the alignment layer.

The polarization films 33 and 34 have a basic construction in which a transparent substrate 36 and a protective material 37 are laminated on the front and the rear of a polarization material 35, respectively. In the polarization film 33 having a low reflective layer, an anti-glare layer 38 and a low reflective layer 39 are laminated, in that order. The polarization films 33 and 34 sandwich a TFT glass substrate 31 and a liquid crystal cell 32 and are disposed so as to twist the polarization angles thereof by 90 degrees.

When a driving signal is applied to transparent electrodes of the TN liquid crystal panel 30, an electric field is produced between the electrodes. Then, the long axes of the molecules of the liquid crystals become parallel to the direction of the electric field by virtue of electric anisotropy of the molecules of the liquid crystal. Therefore, the optical rotary power by the molecules of the liquid crystal is lost. As a result, the light is not transmitted through the liquid crystal panel. The contrast due to difference in light transmittance is recognized as visual information. In the liquid crystal display, the light is irradiated from the back light 40, and images can therefore be formed by the contrast between the portions where light is transmitted and where it is not transmitted. In FIGS. 2 and 3, the structures in which the anti-static anti-reflection film was applied to a polarization film were explained. However, an anti-static anti-reflection film according to the present invention is not limited to such films for displays and can be used as a simple anti-reflection film employed on the surface of windows or the like, and therefore, the uses thereof are not limited at all.

EXAMPLES

In the following, the present invention will be explained in more detail by way of the Examples.

Example 1

6 functional acrylate: dipentaerythritol hexaacrylate (trade name: DPE-6A, produced by Shin-Nakamura Chemistry Co., Ltd.) containing 5% cleavaging-type photoinitiator (trade name: Dalocure 1173, produced by Ciba Specialty Chemicals K.K.) was coated on one surface of triacetyl cellulose film (trade name: Fuji Tack UVD-80, produced by Fuji Film Corporation) having a thickness of 80 $\mu$m, so as to have a layer thickness of 3 $\mu$m. Subsequently, the film was irradiated with UV radiation to cure the coating film, under the conditions of output powder: 120 W/cm, radiation distance: 10 cm, treatment speed: 5 m/min, using one converging type high-pressure mercury lamp. Therefore, a high refractive index hard coat layer was formed.

Next, 2.40 g oxalic acid dihydrate was dissolved to 14.16 g ethanol in a 100 ml three-necked flask, and they were refluxed in an oil bath. A mixture of 2.20 g (10.7 mmol) of tetraethoxysilane, 0.62 g (1.4 mmol) of 1H,1H,2H,2H-tetrahydro perfluorooctyl triethoxysilane, 0.62 g (2.4 mmol) of N-trimethoxysilylpropyl-N,N,N-trimethyl ammonium chloride, and 0.62 g of methanol was dropped thereinto for 30 min, and they were further refluxed for 5 hours and were completely hydrolyzed. This hydrolyzate was diluted 8.26 times with isopropanol as a coating material for a low reflective layer, and this was coated on the above high refractive index hard coat layer by a microphotogravure coating method and was heat-cured at 100° C. for 1 hour by a blast dryer. Thereby, the low reflective layer was formed and an anti-static anti-reflective film of Example 1 was produced.

Example 2

An anti-static anti-reflective film of Example 2 was produced in the same manner as in Example 1, except that the 0.62 g (1.4 mmol) of 1H,1H,2H,2H-tetrahydro perfluorooctyl triethoxysilane in Example 1 was changed to 0.62 g (2.84 mmol) of 1,1,1-tetrahydro perfluoropropyl triethoxysilane.

Example 3

An anti-static anti-reflective film of Example 3 was produced in the same manner as in Example 1, except that in Example 1, the 2.20 g (10.7 mmol) of tetraethoxysilane was changed to 3.00 g (14.4 mmol), the 0.62 g (1.4 mmol) of 1H,1H,2H,2H-tetrahydro perfluorooctyl triethoxysilane was changed to 0.24 g (0.4 mmol), and the 0.62 g (2.4 mmol) of N-trimethoxysilylpropyl-N,N,N-trimethylammonium chloride was changed to 0.62 g (1.2 mmol) of octadecyl dimethyl [3-(trimethoxysilyl) propyl] ammonium chloride.

Example 4

An anti-static anti-reflective film of Example 4 was produced in the same manner as in Example 1, except that the 0.62 g (2.4 mmol) of N-trimethoxysilylpropyl-N,N,N-trimethyl ammonium chloride in Example 1 was changed to 0.62 g (2.3 mmol) of N-(trimethoxypropyl) isothiolonium chloride.

Comparative Example 1

2.40 g of oxalic acid was dissolved in 14.16 g ethanol in a 100 ml three-necked flask, and they were refluxed in an oil bath. A mixture of 2.20 g (10.7 mmol) of tetraethoxysilane, and 1.24 g (2.7 mmol) of 1H,1H,2H,2H-tetrahydro perfluorooctyl triethoxysilane was dropped thereinto for 30 min, and they were further refluxed for 5 hours and were completely hydrolyzed. This hydrolyzate was diluted 8.26 times with isopropanol, and a coating material for a low reflective layer was produced. An anti-static anti-reflective film of Comparative Example 1 was produced in the same manner as in Example 1, except that the coating material for a low reflective layer was employed.

With regard to the anti-static anti-reflective films of Examples 1 to 4 and Comparative Example 1 as obtained above, the ratio of fluorine atoms to silicon atoms, nitrogen content, reflectance, abrasion resistance, static attenuation half-value period, and anti-static property were measured by the following methods and were evaluated.

(1) Ratio of Fluorine Atoms to Silicon Atoms

Each coating material for a low reflective layer in the Examples and the Comparative Example was coated on a PET film and was dried, and carbon shadowing was carried on the layer, and test samples were prepared. Next, concentration of atoms in the test sample was measured using an electron beam micro analyzer (trade name: EMAX-7000, produced by JEOL Ltd.). Measuring conditions were acceleration voltage: 20 kV, incidence angle: 90 degrees, ejection angle: 35 degrees. F/Si was calculated by concentration of atoms as obtained above.

(2) Nitrogen Content

Test samples were prepared by drying each coating material for a low reflective layer of the Examples and the Comparative Example in sample tubes (desolvention), and the nitrogen content of the test sample was measured using an elemental analyzer (trade name: EA-1108, produced by CARLOERBA Co., Ltd.). Measuring conditions were correlation sample: acetanilide, combustion tube: 1020° C., reduction tube: 650° C., and detector: TCD detector.

(3) Spectral Reflectance

A surface not provided with a low reflective layer of each anti-static anti-reflective film of the Examples and the Comparative Example was roughened by steel-wool and was painted with black magic ink to block out reflections, and thereby test samples were prepared. 5 degree specular reflectance was measured on a surface provided with a low reflective layer of the test sample at wavelengths of 550 nm, using a spectrophotometer (trade name: UV 3100, produced by Shimadzu Corporation).

(4) Abrasion Resistance

A surface not provided with a low reflective layer of each anti-static anti-reflective film of the Examples and the Comparative Example was roughened by steel-wool and was painted with black magic ink to block out reflections, and thereby test samples were prepared. A surface provided with a low reflective layer of the test sample was strongly rubbed about 20 times by a finger, oil from the finger adhered on the surface was removed by tissue paper, and abrasion resistance was evaluated by observing the difference in color between a rubbed portion and the surrounding portion. In this evaluation, the following criteria were used: cases where the color difference was confirmed: X; cases where the color difference was not confirmed: ○.

(5) Static Attenuation Half-Value Period

Static attenuation half-value period of each anti-static anti-reflective film was measured in accordance with Japanese Industrial Standard L-1094, using a static honest meter (produced by Shishido Static Electricity Co., Ltd.).

(6) Anti-static Property 1

The frontmost surface of each anti-static anti-reflective film was rubbed with a cloth made of polyester resin and was charged. After 5 minutes, a charged surface of the anti-static anti-reflective film was brought close to an ashtray which contained cigarette ashes, and the anti-static property was evaluated by observing the adhesion of the ashes. In this evaluation, the following criteria were used: cases where there was no adhesion of the ashes: ○; cases where there was adhesion of the ashes: X.

(7) Anti-static Property 2

A printing paper was put on the surface of each anti-static anti-reflective film, and the surface of the film was rubbed 20 times by holding an edge of the printing paper and using the self-weight of the paper. Subsequently, the film was hung down vertical to the floor, and the anti-static property was evaluated by observing the falling of the paper. In this evaluation, the following criteria were used: cases where the paper fell (there was no frictional electrification): ○; cases where the paper did not fall (there was frictional electrification): X.

The above evaluated results are shown in Table 1.

TABLE 1

| | Ratio of Fluorine Atoms to Silicon Atoms (F/Si) | Nitrogen Contents (weight %) | Reflectance (%) | Abrasion Resistance | Static Attenuation Half-Value Period (seconds) | Anti-static Property 1 | Anti-static Property 2 |
|---|---|---|---|---|---|---|---|
| Example 1 | 7.16 | 1.77 | 2.03 | ○ | 20 | ○ | ○ |
| Example 2 | 1.03 | 1.77 | 1.86 | ○ | 40 | ○ | ○ |
| Example 3 | 2.02 | 0.92 | 1.78 | ○ | 60 | ○ | ○ |
| Example 4 | 8.30 | 3.40 | 1.98 | ○ | 20 | ○ | ○ |
| Comparative Example 1 | 6.30 | 0.20 | 1.72 | ○ | 700 | X | X |

As is apparent from the results shown in Table 1, in Comparative Example 1 which is a conventional anti-reflective film, there was a problem in anti-static properties. In contrast, in the anti-static anti-reflective films of the present invention, superior anti-static properties were exhibited while superior reflectance and abrasion resistance were retained.

As explained above, according to the present invention, a low reflective layer is provided by coating a silicon compound containing at least a cation-modified silicon compound directly on a transparent substrate or via another layer and curing them, and therefore, not only conventional superior optical properties and physical properties, but also superior anti-static properties are exhibited. In particular, an anti-static anti-reflective film according to the present invention can be preferably employed by adhering to the surface of various displays, etc., since adhesion of dust, etc., can be prevented.

What is claimed is:

1. An anti-static, anti-reflective film, comprising a low reflective layer provided on the surface of a transparent substrate directly or by another layer, wherein said low reflective layer is formed by curing at least one silicon composition, wherein said silicon composition comprises a cation-modified silicon compound, and said low refractive layer has a nitrogen content of 0.5 to 2.0% by weight.

2. An anti-static, anti-reflective film according to claim 1, wherein said cation-modified silicon compound is a quaternary ammonium salt thereof.

3. An anti-static, anti-reflective film according to claim 1, wherein said silicon composition further comprises a fluorine-modified silicon compound and the ratio of fluorine atoms to silicon atoms (F/Si) in said silicon composition is a range of 1.0 to 7.5.

4. An anti-static, anti-reflective film according to claim 2, wherein said silicon composition further comprises a fluorine-modified silicon compound and the ratio of fluorine atoms to silicon atoms (F/Si) in said silicon composition is a range of 1.0 to 7.5.

* * * * *